US012607720B2

(12) United States Patent
He

(10) Patent No.: US 12,607,720 B2
(45) Date of Patent: Apr. 21, 2026

(54) COMPENSATION METHOD AND APPARATUS FOR CONTINUOUS WAVE RANGING AND LiDAR

(71) Applicant: SUTENG INNOVATION TECHNOLOGY CO., LTD., Shenzhen (CN)

(72) Inventor: Yixiong He, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 679 days.

(21) Appl. No.: 17/951,188

(22) Filed: Sep. 23, 2022

(65) Prior Publication Data

US 2023/0017188 A1 Jan. 19, 2023

Related U.S. Application Data

(63) Continuation of application No. PCT/CN2020/081755, filed on Mar. 27, 2020.

(51) Int. Cl.
| | |
|---|---|
| *G01S 7/48* | (2006.01) |
| *G01S 7/497* | (2006.01) |
| *G01S 17/32* | (2020.01) |
| *G01S 17/894* | (2020.01) |

(52) U.S. Cl.
CPC .......... *G01S 7/4808* (2013.01); *G01S 7/4802* (2013.01); *G01S 7/497* (2013.01); *G01S 17/32* (2013.01); *G01S 17/894* (2020.01)

(58) Field of Classification Search
CPC ...... G01S 7/4808; G01S 7/4802; G01S 7/497; G01S 17/32; G01S 17/894
See application file for complete search history.

(56) References Cited

FOREIGN PATENT DOCUMENTS

| | | |
|---|---|---|
| CN | 109143252 A | 1/2019 |
| CN | 109581399 A | 4/2019 |
| CN | 109889809 A | 6/2019 |
| CN | 109917355 A | 6/2019 |
| CN | 209676383 U | 11/2019 |
| WO | 2019245719 A1 | 12/2019 |
| WO | WO-2021102648 A1 * | 6/2021 |

OTHER PUBLICATIONS

Espros ("Espros on ToF Camera Calibration", Image Sensors World, Nov. 22, 2019.) (Year: 2019).*
First Office Action issued in related Chinese Application No. 202080004308.7, mailed May 7, 2023, 33 pages.
Kangzhe Hu, "Research and Implementation of Depth Imaging System based on TOF Principle", Apr. 2018, 95 pages.
International search report and written opinion issued in related Application No. PCT/CN2020/081755, mailed Jan. 4, 2021, 4 pages.

* cited by examiner

*Primary Examiner* — Lisa M Caputo
*Assistant Examiner* — Christian T Bryant
(74) *Attorney, Agent, or Firm* — BAYES PLLC

(57) ABSTRACT

This application discloses a compensation method and apparatus for continuous wave ranging and a LiDAR. The compensation method includes: calculating a reflectivity of an object detected by a receiving unit, querying, based on a preset mapping relation, for a target distance response non-uniformity (DRNU) calibration compensation matrix associated with the reflectivity, and compensating, using the target DRNU calibration compensation matrix, for a distance of the object detected by the receiving unit.

6 Claims, 4 Drawing Sheets

S201. Calculate a reflectivity of an object detected by a receiving unit

S202. Query, based on a preset mapping relationship, for a target DRNU calibration compensation matrix associated with the reflectivity S203. Compensate, using the target DRNU calibration compensation matrix, for a distance of the object detected by the receiving unit

COMPENSATION METHOD AND APPARATUS FOR CONTINUOUS WAVE RANGING AND LiDAR

CROSS-REFERENCE TO RELATED APPLICATION

The present application is a continuation of International Application No. PCT/CN2020/081755, filed on Mar. 27, 2020, the content of which is incorporated herein by reference in its entirety.

TECHNICAL FIELD

This application relates to the measurement field, and in particular, to a compensation method and apparatus for continuous wave ranging and a LiDAR.

BACKGROUND

Flash LiDAR and Time-of-Flight (TOF) depth camera are basically the same in terms of principles: a laser diode or a LED light source is controlled to illuminate a field, then an echo signal is received, and the time of flight of photons is analyzed to measure a depth (distance) of a point in the field. The flash LiDAR has a working principle similar to that of a conventional CCD-based camera. From the perspective of principles, incoherent flash LiDARs can be classified into a continuous wave type and a pulse type. Generally, the pulse or continuous-wave outgoing signal of the flash LiDAR cover the entire detected field without any scanning structure. A basic principle of the continuous-wave flash LiDAR is that the outgoing signal is an optical signal modulated by a carrier signal of characteristic frequency, and a phase difference between the echo signal and the outgoing signal is calculated, to obtain distance information.

In a ranging device based on CW-TOF (continuous-wave time-of-flight), a receiving chip (for example, a CMOS device) includes a plurality of receiving units (for example, a pixel circuit), and the receiving unit is configured to convert a received optical signal into an electrical signal. Because manufacturing processes, environmental parameters, modulation waveforms, or the like of receiving units in the receiving chip are different, distance response non-uniformity (DRNU) occurs between the receiving units, which is specifically characterized by a relatively large error between a ranging result obtained by the receiving unit and an actual ranging result.

SUMMARY

Embodiments of this application provide a compensation method and apparatus for continuous wave ranging and a LiDAR, to resolve a problem of low ranging precision when continuous waves are used for ranging.

According to a first aspect, this application provides a compensation method for continuous wave ranging, including:

calculating a reflectivity of an object detected by a receiving unit, where the receiving unit is any receiving unit in a receiving chip, a depth image can be generated by each receiving unit in a receiving chip of a TOF camera or flash LiDAR based on a detected optical signal, and the greater quantity of receiving units indicates the higher resolution of the depth image, that is, the greater quantity of pixels in the depth image, where parameters of the object detected by the receiving unit include: a spatial position, echo intensity, and a distance; the reflectivity of the object detected by the receiving unit is a reflectivity of a point on a surface of the object; and the reflectivity is related to a material of the surface of the object, and the higher reflectivity indicates the greater echo intensity of the pixel; or the lower reflectivity indicates the smaller echo intensity of the pixel;

querying, based on a preset mapping relation, for a target DRNU calibration compensation matrix associated with the reflectivity, where the preset mapping relation represents a mapping relation between the reflectivity and the DRNU calibration compensation matrix, and the DRNU calibration compensation matrix is used for calibration with respect to an error between a distance of the object detected by the receiving unit and an actual distance; and the DRNU calibration compensation matrix in this application is related to the reflectivity, and different reflectivities are associated with different DRNU calibration compensation matrices; and compensating for the distance of the object detected by the receiving unit based on the target DRNU calibration compensation matrix, where the distance of the object detected by the receiving unit can be compensated for through a lookup table or linear interpolation based on the target DRNU calibration compensation matrix in this application.

In an embodiment, calculating a reflectivity of an object detected by a receiving unit includes:

calculating the reflectivity of the object detected by the receiving unit based on a preset calibration distance, the distance of the object detected by the receiving unit, and amplitude of an echo signal received by the receiving unit.

In an embodiment, calculating the reflectivity of the object detected by the receiving unit based on a preset calibration distance, the distance of the object detected by the receiving unit, and amplitude of an echo signal received by the receiving unit includes:

calculating the reflectivity of the object detected by the receiving unit based on the following formula:

$$f_1 = G_{R_0}(A_1) \times \left(\frac{d_1}{R_0}\right)^2,$$

where $f_1$ is the reflectivity of the object detected by the receiving unit; $R_0$ is the preset calibration distance; $A_1$ represents the amplitude of the echo signal received by the receiving unit; $d_1$ represents the distance of the object detected by the receiving unit; and $G_{R_0}(\ )$ is a fitting function representing a relationship between a reflectivity and an amplitude at the preset calibration distance.

In an embodiment, before calculating a reflectivity of an object detected by a receiving unit, the method further includes:

measuring calibration amplitudes respectively corresponding to a plurality of calibration reflectivities at the calibration distance; and performing fitting on the plurality of calibration reflectivities and the calibration amplitudes respectively corresponding to the plurality of calibration reflectivities, to obtain the fitting function.

In an embodiment, calculating the reflectivity of the object detected by the receiving unit based on a preset calibration distance, the distance of the object detected by the receiving unit, and amplitude of an echo signal received by the receiving unit includes:

calculating the reflectivity of the object detected by the receiving unit based on a preset lookup table, the preset calibration distance, the distance of the object detected by the receiving unit, and the amplitude of the echo signal received by the receiving unit.

In an embodiment, before calculating a reflectivity of an object detected by a receiving unit, the method further includes:

measuring calibration amplitudes respectively corresponding to a plurality of calibration reflectivities at the calibration distance; and performing mapping on the calibration distance, the calibration reflectivity, and the calibration amplitudes respectively corresponding to the plurality of calibration reflectivities, to obtain the lookup table.

In an embodiment, the method further includes:

calculating DRNU calibration compensation matrices respectively corresponding to the plurality of calibration reflectivities; and performing mapping on the plurality of calibration reflectivities and their corresponding DRNU calibration compensation matrices to generate the mapping relation, and storing the mapping relation.

According to a second aspect, this application provides a compensation apparatus for continuous wave ranging, including:

a calculating unit, configured to calculate a reflectivity of an object detected by a receiving unit;

a querying unit, configured to query, based on preset mapping, for a target DRNU calibration compensation matrix associated with the reflectivity; and a compensation unit, configured to compensate, using the target DRNU calibration compensation matrix, for a distance of the object detected by the receiving unit.

According to another aspect of this application, a compensation apparatus for continuous wave ranging is disclosed, where a distance compensation device includes: a receiver, an emitter, a memory, and a processor, a group of program code is stored in the memory, and the processor is configured to invoke the program code stored in the memory to execute the compensation method for continuous wave ranging according to the foregoing aspects.

According to another aspect of this application, a computer-readable storage medium is provided, where the computer-readable storage medium stores an instruction, and when running on the computer, the instruction enables the computer to perform the method according to the foregoing aspects.

According to another aspect of this application, a computer program product including an instruction is provided, and when running on the computer, the instruction enables the computer to perform the method according to the foregoing aspects.

In the embodiments of this application, the reflectivity of the object detected by the receiving unit is calculated, the target DRNU calibration compensation matrix associated with the reflectivity is queried for based on the preset mapping relation, where the preset mapping relation represents the relation between the reflectivity and the DRNU calibration compensation matrix, and different reflectivities are corresponding to different DRNU calibration compensation matrices. The distance of the object detected by the receiving unit is compensated using the target DRNU calibration compensation matrix. In this application, the target DRNU calibration compensation matrix corresponding to the reflectivity of the object is used to compensate for the distance of the object detected by the receiving unit, to resolve a low ranging precision problem caused due to use of a constant DRNU calibration compensation matrix to compensate for the distance in a related art, thereby improving ranging precision.

BRIEF DESCRIPTION OF THE DRAWINGS

In order to more clearly describe the technical solutions in embodiments of the present application or the background, the following describes the drawings used in the embodiments of the present application.

DETAILED DESCRIPTION

Figure 1:
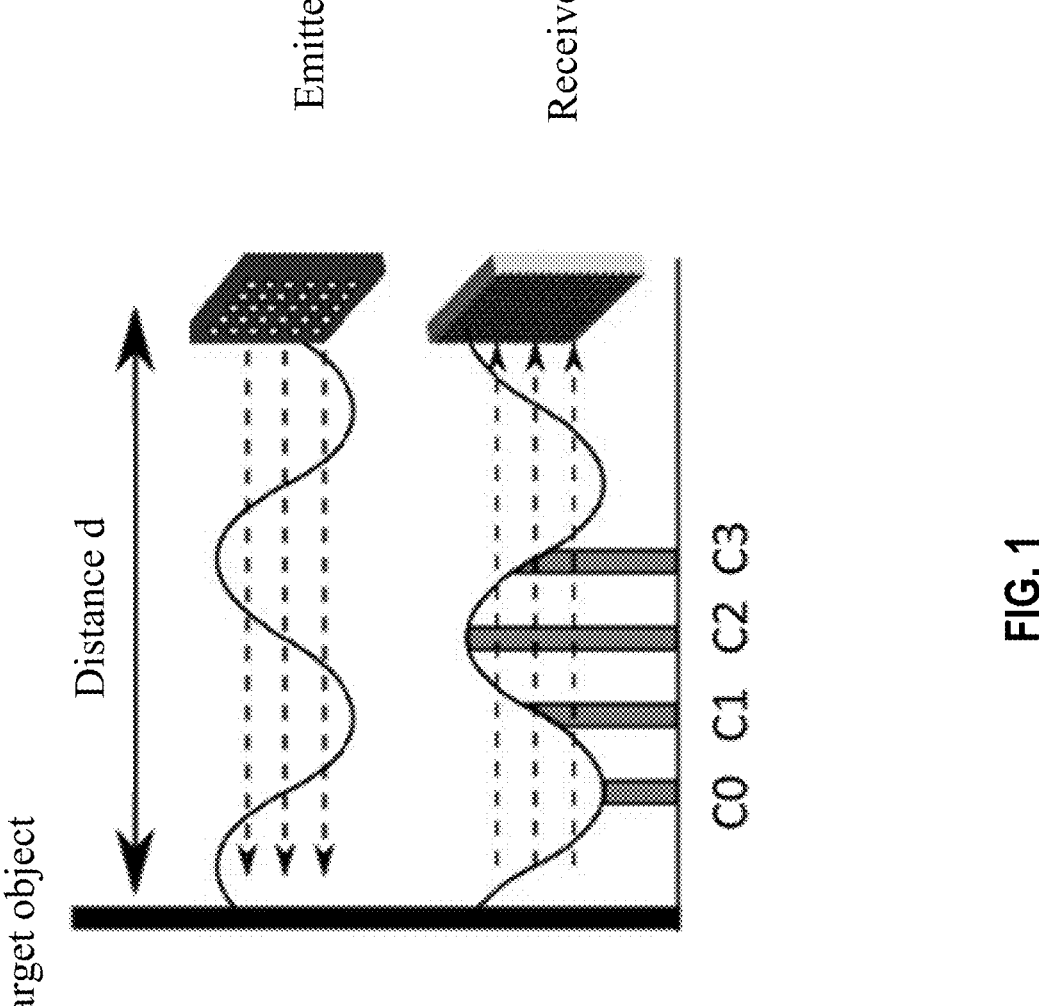
FIG. 1 is a schematic diagram of a principle of continuous wave ranging according to an embodiment of this application.

FIG. 1 is a schematic diagram of a principle of continuous wave ranging according to this application.

A ranging device can measure the distance between an object and the device based on a principle of continuous-wave time-of-flight (CW-TOF). The ranging device may be a flash LiDAR or a TOF camera. The ranging device is provided with an emitter and a receiver. The emitter is configured to emit a continuously emitted signal to the object, and the receiver is configured to receive an echo signal formed after the emitted signal reaches the object. The ranging device generates a depth image based on the echo signal. The depth image includes a plurality of pixels, and the pixels include information about distance, echo intensity, and spatial position. When the ranging device is a flash LiDAR, a signal sent and received by the ranging device is a laser signal, and the emitter can be a laser source, such as an LED light source or a VCSEL light source, and the receiver is a CMOS receiver.

Assuming that the emitted signal is s(t) and the received echo signal is r(t), the emitted signal s(t) in the time domain is expressed as Formula 1:

$$s(t)=a_1+a_2 \cos(2\pi ft)$$

The echo signal in the time domain is expressed as Formula 2:

$$r(t)=A \cos(2\pi ft-2\pi f\tau)+B$$

In Formula 1 and Formula 2, f is the modulation frequency of the emitted signal, $\tau$ is the delay between the emitted signal and the echo signal, $\phi=2\pi f\tau$, which represents a phase difference between the echo signal and the emitted signal, $a_1$ is the offset of the emitted signal, $a_2$ is the modulation amplitude of the emitted signal, A is the amplitude of the echo signal, and B is the offset of the echo signal caused due to interference of background noise.

A cross-correlation function of the power of the emitted signal and the echo signal is expressed as Formula 3:

$$C(x, \tau) = \lim_{T \to \infty} \frac{1}{T} \int_{-T/2}^{+T/2} s(t) r(t - x) dt = \frac{a_2 A}{2} \cos(2\pi f(x + \tau)) + a_1 B$$

Herein, assuming that $\psi = 2\pi fx$ and $\phi = 2\pi ft$, Formula 3 can be transformed into the following Formula 4:

$$C(\psi, \phi) = \frac{a_2}{2} \cos(\psi + \phi) + a_1 B$$

A modulation period of the emitted signal s(t) is $2\pi$, and amplitude values of 4 sampling points with an equal phase gap are collected in one modulation period. For example, if a phase gap between two adjacent sampling points in the 4 sampling points is $\pi/2$, $\psi_0 = 0$, $\psi_1 = \pi/2$, $\psi_2 = \pi$, and $\psi_3 = 3\pi/2$; and corresponding amplitude values are: $C_0 = C(0, \phi)$, $C_1 = C(\pi/2, \phi)$, $C_2 = C(\pi, \phi)$, and $C_3 = C(3\pi/2, \phi)$. The offset B, the amplitude A, and the phase difference $\phi$ in the echo signal r(t) can be calculated based on the foregoing 4 amplitude values.

The phase difference $\phi$ is expressed as Formula 5:

$$\phi = \arctan\left(\frac{C_3 - C_1}{C_0 - C_2}\right)$$

The amplitude A is expressed as Formula 6:

$$A = \frac{1}{a_2} \sqrt{(C_3 - C_1)^2 + (C_0 - C_2)^2}$$

The offset B is expressed as Formula 7:

$$B = \frac{1}{4a_1}(C_0 + C_1 + C_2 + C_3)$$

A distance between the ranging device and the object can be calculated using Formula 8:

$$d = \frac{c}{4\pi f} \phi = \frac{c}{4\pi f} \arctan\left(\frac{C_3 - C_1}{C_0 - C_2}\right)$$

The receiver includes a plurality of receiving units (pixel circuits), one receiving unit is corresponding to one pixel in the depth image, and receiving units in the receiver have different characteristics due to manufacturing processes, environmental factors, or the like. The receiving units have different responses when receiving echo signals of the same characteristic, and therefore, the receiving units provide different measured distances for the same object. That is, distance response non-uniformity (DRNU) occurs in the receiving units. In other words, there is a nonlinear relationship between the ranging difference and the measured distances between the receiving units and the actual distance.

To improve ranging precision, a DRNU calibration compensation matrix in the related art is usually used for calibration and compensation for the foregoing DRNU difference. A calibration compensation process includes the following. Firstly, calibrating the ranging device within a specific ranging range by using an object with a known reflectivity, establishing a DRNU calibration compensation matrix, and determining a nonlinear relationship between measured distances corresponding to all receiving units and an actual distance. Then, in an actual ranging process, the measured distance is calibrated and corrected by querying for the DRNU calibration compensation matrix and by using linear interpolation calculation, thereby improving ranging accuracy.

However, the distance compensation method in the related art has the following defects: when there is a larger difference between an actually measured reflectivity of an object and a calibration reflectivity, there is a larger error of a measured distance of a pixel, thereby affecting detection precision of a system.

To resolve the problem of inaccurate calibration in the related art, an embodiment of this application provides a compensation method for continuous wave ranging.

Figure 2:
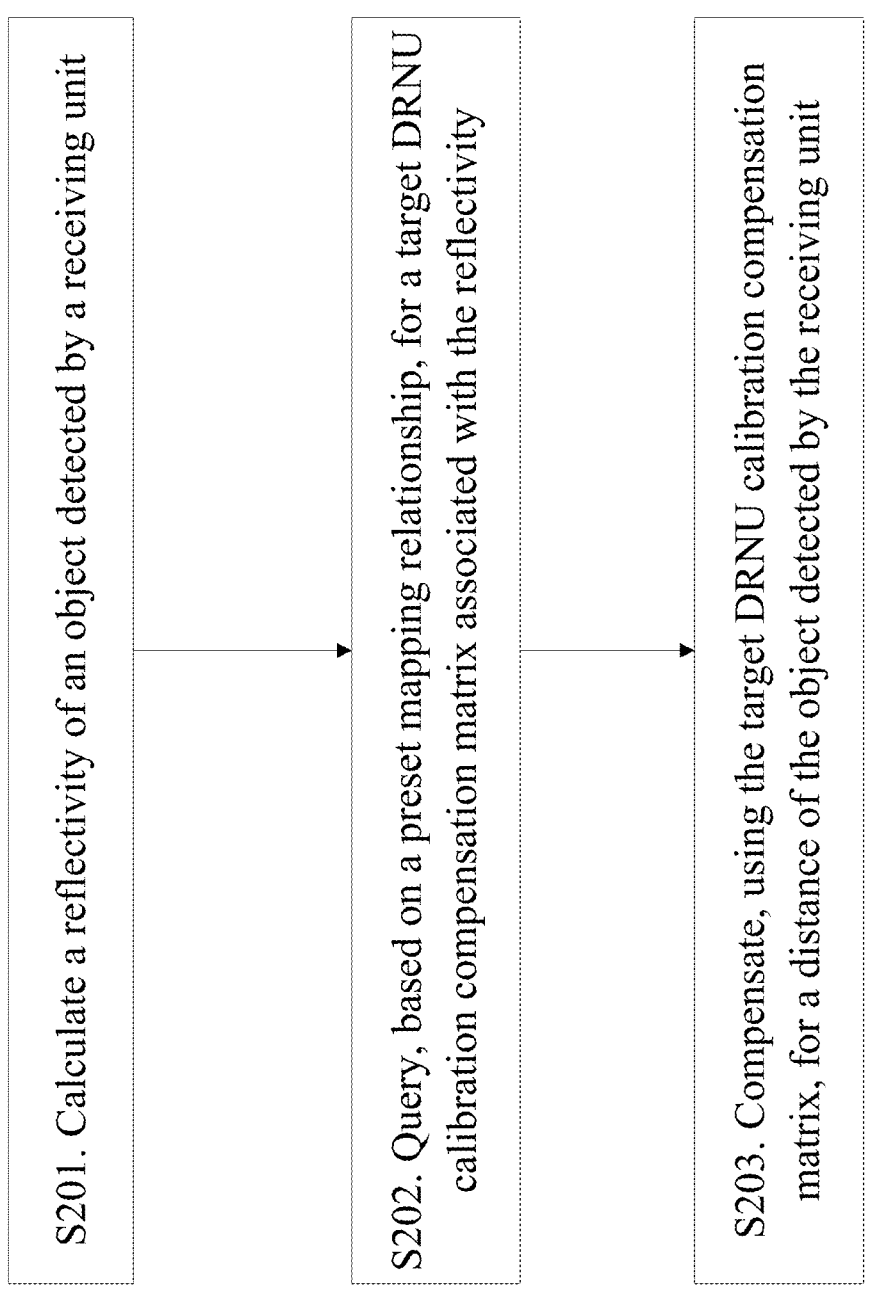
FIG. 2 is a schematic flowchart of a compensation method for continuous wave ranging according to an embodiment of this application.

Referring to FIG. 2, FIG. 2 shows a compensation method for continuous wave ranging according to an embodiment of this application. The method includes but is not limited to the following steps:

S201. Calculate a reflectivity of an object detected by a receiving unit.

The receiving unit is any receiving unit in a receiving chip, a depth image can be generated by each receiving unit in a receiving chip of a TOF camera or flash LiDAR based on a detected optical signal, and the greater quantity of receiving units indicates higher resolution of the depth image, that is, the greater quantity of pixels in the depth image. Parameters of the object detected by the receiving unit include: spatial position, echo intensity, distance, and the like. The reflectivity of the object detected by the receiving unit is a reflectivity of a surface of the object. The reflectivity is related to factors such as the material of the surface of the object and an incident angle of an outgoing signal. A higher reflectivity indicates a greater echo intensity of the pixel; or a lower reflectivity indicates a smaller echo intensity of the pixel.

In an embodiment, calculating a reflectivity of an object detected by a receiving unit includes:

calculating the reflectivity of the object detected by the receiving unit based on a preset calibration distance, the distance of the object detected by the receiving unit, and the amplitude of an echo signal received by the receiving unit.

The preset calibration distance is a known constant, the calibration distance is within the ranging range, and the distance and amplitude of the object detected by the receiving unit can be calculated based on the CW-TOF principle. For example, for a method of calculating the distance of the object detected by the receiving unit, refer to Formula 8. For a method of calculating the amplitude of the echo signal received by the receiving unit, refer to Formula 6.

Further, calculating the reflectivity of the object detected by the receiving unit based on the following formula:

$$f_1 = G_{R_0}(A_1) \times \left(\frac{d_1}{R_0}\right)^2;$$

where $f_1$ is the reflectivity of the object detected by the receiving unit; $R_0$ is the preset calibration distance, which is a known value representing a distance between the ranging device and the object; $A_1$ represents the amplitude of the echo signal received by the receiving unit, the amplitude of the echo signal received by the receiving unit is calculated by the ranging device based on the parameter of the echo signal, and therefore, the amplitude of the echo signal received by the receiving unit is a measured value; $d_1$ represents the distance of the object detected by the receiving unit, the distance of the object detected by the receiving unit is calculated by the ranging device based on the parameter of the echo signal, and the distance of the object detected by the receiving unit is also a measured value; and $G_{R_0}(\ )$ is a fitting function representing a relationship between a reflectivity and amplitude at the preset calibration distance.

Herein, $G_{R_0}(\ )$ is a fitting function whose amplitude is an independent variable. The fitting function can be a linear function or a nonlinear function. After the measured amplitude of the echo signal received by the receiving unit is substituted into the fitting function, the reflectivity of the object detected by the receiving unit can be obtained.

In an embodiment, a process for generating the fitting function includes:

measuring calibration amplitudes respectively corresponding to a plurality of calibration reflectivities at the calibration distance; and performing fitting on the plurality of calibration reflectivities and the calibration amplitudes respectively corresponding to the plurality of calibration reflectivities, to obtain the fitting function. The quantity and values of calibration reflectivities can depend on an actual need. With the greater quantity of calibration reflectivities and the smaller value difference, the fitting function can more accurately represent the relation between the amplitudes and reflectivities at the calibration distance. A fitting method is not limited in this embodiment of this application. For example, in this embodiment of this application, the least square method may be used to perform fitting to obtain the fitting function.

For example, referring to Table 1, the calibration distance is 1 m, that is, an actual distance between the ranging device and each calibration target is 1 m, and calibration reflectivities of calibration targets are 10%, 20%, 30%, 40%, 50%, 60%, and 70% respectively. Amplitudes of echo signals detected by the receiving unit at the foregoing reflectivities measured by the ranging device respectively are B1 to B7. Fitting is performed on 7 groups of data (calibration reflectivity and calibration amplitude) in Table 1 in the least square method to obtain the fitting function $f=G_{R_0}(A)$, where $f$ is the reflectivity, and A is the amplitude.

TABLE 1

| Object number | Calibration reflectivity | Calibration distance | Calibration amplitude |
|---|---|---|---|
| 1 | 10% | 1 m | B1 |
| 2 | 20% | 1 m | B2 |
| 3 | 30% | 1 m | B3 |
| 4 | 40% | 1 m | B4 |
| 5 | 50% | 1 m | B5 |
| 6 | 60% | 1 m | B6 |
| 7 | 70% | 1 m | B7 |

In an embodiment, calculating a reflectivity of an object detected by a receiving unit includes:

calculating the reflectivity of the object detected by the receiving unit based on a preset lookup table, the preset calibration distance, the distance of the object detected by the receiving unit, and the amplitude of the echo signal received by the receiving unit.

The lookup table stores a mapping relation between amplitude and the reflectivity at the calibration distance. The lookup table is provided with a plurality of entries, and each entry stores a calibration reflectivity and a calibration amplitude. The ranging device queries the lookup table for the corresponding reflectivity based on the calculated amplitude, to further obtain a percentage coefficient based on the calculated distance of the object detected by the receiving unit and the calibration distance, and an actual reflectivity corresponding to the pixel is obtained by multiplying the reflectivity found in the lookup table by the percentage coefficient.

For example, the calibration distance is $R_0$, the amplitude, which is measured by the ranging device, of the echo signal received by the receiving unit is $A_1$, and the measured distance of the object detected by the receiving unit is d1. The reflectivity $f_0$ is found in the lookup table based on the amplitude $A_1$ of the echo signal received by the receiving unit, and the actual reflectivity $f_1$ corresponding to the pixel satisfies that $$f_1 = f_0 \times \left(\frac{d1}{R_0}\right)^2.$$

In an embodiment, a method of generating the lookup table includes:

measuring calibration amplitudes respectively corresponding to a plurality of calibration reflectivities at the calibration distance; and performing mapping on the calibration distance, the plurality of calibration reflectivities, and the calibration amplitudes respectively corresponding to the plurality of calibration reflectivities, to obtain the lookup table.

The calibration distance is the actual distance between the ranging device and the calibration target, and the calibration distance is known. With the greater quantity of reflectivities and a smaller value difference between the calibration reflectivities, the reflectivity of the object can be more accurately calculated based on the look-up table.

For example, the calibration distance is 2 m, that is, the actual distance between the ranging device and each calibration target is 2 m, and the plurality of calibration reflectivities are 5%, 15%, 25%, 35%, 45%, 55%, and 65%. The ranging device measures calibration targets of the foregoing reflectivities respectively, the amplitudes of echo signals detected by the receiving unit are C1 to C7 respectively, and the look-up table shown in Table 1 is generated after mapping is performed based on the foregoing calibration reflectivities and calibration amplitudes. Assuming that amplitude C1 of the echo signal received by the receiving unit is calculated by the ranging device in S201, the reflectivity found in the look-up table, namely Table 2, is 5%, and the distance d1 of the object detected by the receiving unit is measured by the ranging device, an actual reflectivity corresponding to the pixel is $5\% \times (d\frac{1}{2})^2$.

TABLE 2

| Object number | Calibration reflectivity | Calibration distance | Calibration amplitude |
|---|---|---|---|
| 1 | 5% | 1 m | C1 |
| 2 | 15% | 1 m | C2 |
| 3 | 25% | 1 m | C3 |
| 4 | 35% | 1 m | C4 |
| 5 | 45% | 1 m | C5 |
| 6 | 55% | 1 m | C6 |
| 7 | 65% | 1 m | C7 |

S202. Query, based on a preset mapping relation, for a target DRNU calibration compensation matrix associated with the reflectivity.

The ranging device pre-stores or is pre-configured with a mapping relation. The mapping relation represents the relation between the reflectivity and the DRNU calibration compensation matrix. The DRNU calibration compensation matrix is used to compensate for the distance of the object detected by the receiving unit. In the mapping relation, different reflectivities are associated with different DRNU calibration compensation matrices.

For example, the mapping relation is shown in Table 3:

TABLE 3

| Reflectivity | Number of DRNU calibration compensation matrix |
|---|---|
| 5% | 1 |
| 15% | 2 |
| 25% | 3 |
| 35% | 4 |
| 45% | 5 |
| 55% | 6 |
| 65% | 7 |

In an embodiment, a process of establishing the mapping relation includes:

determining the plurality of known calibration reflectivities, and separately calculating DRNU calibration compensation matrices respectively corresponding to the plurality of calibration reflectivities; and performing mapping on the plurality of calibration reflectivities and their corresponding DRNU calibration compensation matrices to generate the mapping relation, and storing the mapping relation.

For example, the plurality of known calibration reflectivities are 10%, 20%, . . . , 90% respectively, and DRNU calibration compensation matrices corresponding to different calibration reflectivities are obtained respectively. Therefore, compared with that in the related art, a one-dimensional variable (reflectivity f) is added to the DRNU calibration compensation matrix in this embodiment of this application. Therefore, the DRNU calibration compensation matrix in this embodiment of this application is corresponding to at least four dimensions (x, y, d, and f), where x represents an abscissa of the pixel, y represents an ordinate of the pixel, d represents the distance (measured distance) of the object detected by the receiving unit, f represents the reflectivity, and the ranging device stores the mapping relation for invoking during subsequent calibration.

S203. Compensate, using the target DRNU calibration compensation matrix, for a distance of the object detected by the receiving unit.

After the abscissa of the pixel, the ordinate of the pixel, the measured distance of the pixel, and the reflectivity of the object calculated in S201 are substituted into the target DRNU calibration compensation matrix, the distance d1 of the object detected by the receiving unit is corrected based on the lookup table and linear interpolation, to obtain the actual distance of the pixel.

A compensation process is described below. The DRNU means that distance responses of receiving units are uneven, and there is a nonlinear relationship between the measured distances of the receiving units and the actual distance. Ideally, there is a strict linear relationship between the measured distances of receiving units and the actual distance, and the receiving units have the same response to the same distance without a difference. Due to modulation methods and an inherent difference between the receiving units, there is a nonlinear relationship between the measured distances of the object detected by the receiving units and the actual distance, and the receiving units show a difference for the same distance.

To correct a DRNU error, in this embodiment, the lookup table and linear interpolation can be used to correct each receiving unit respectively, and a specific method is as follows:

A non-calibrated LiDAR system is calibrated within a maximum measurement range, to obtain a table about the actual distance and the measured distance P(x,y) of each receiving unit. Details are schematically illustrated by using the following table.

TABLE 4

| Actual distance R1(x, y) | Measured distance R2(x, y) | Offset ΔR(x, y) |
|---|---|---|
| 1 m | 1.2 m | +0.2 m |
| 2 m | 2.3 m | +0.3 m |
| 3 m | 2.9 m | −0.1 m |

Tables of relations between measured distances and actual distances of all pixels are combined. A combination result is referred to as the DRNU calibration compensation matrix, and the calibration matrix is stored in a memory of the LiDAR. When the LiDAR works, the DRNU calibration compensation matrix is invoked from the memory, to perform linear interpolation calibration on the measured distances of the receiving units respectively. For example, the measured distance d1 P(x,y) of the receiving unit before calibration satisfies that d1=1.5 m, with reference to the foregoing Table 4, R2(x,y) in the table corresponding to d1 is between 1.2 m and 2.3 m, the actual distance R1(x, y) in a mapping relation is between 1 m and 2 m, and by using a linear interpolation formula, a result of d2 is obtained after calibration of d1, and the formula is as follows:

$$d2 = 1 \text{ m} + \frac{2 \text{ m} - 1 \text{ m}}{2.3 \text{ m} - 1.2 \text{ m}} \times (d1 - 1.2 \text{ m}).$$

Based on the description in FIG. 2, the reflectivity of the object detected by the receiving unit is calculated, and the target DRNU calibration compensation matrix associated with the reflectivity is queried based on the preset mapping relation, where the preset mapping relation represents the relation between the reflectivity and the DRNU calibration compensation matrix, and different reflectivities are corresponding to different DRNU calibration compensation matrices; and the distance of the object detected by the receiving unit is compensated using the target DRNU calibration compensation matrix. In this application, the target DRNU calibration compensation matrix corresponding to the reflectivity of the object is used to compensate for the distance of the object detected by the receiving unit, to resolve the low ranging precision problem caused by the use of a constant DRNU calibration compensation matrix to compensate for the distance in related art, thereby improving ranging precision.

The compensation method for continuous wave ranging in this embodiment of this application is described in detail above, and a compensation apparatus for continuous wave ranging (referred to as apparatus 3 below) in this embodiment of this application is provided below.

Figure 3:
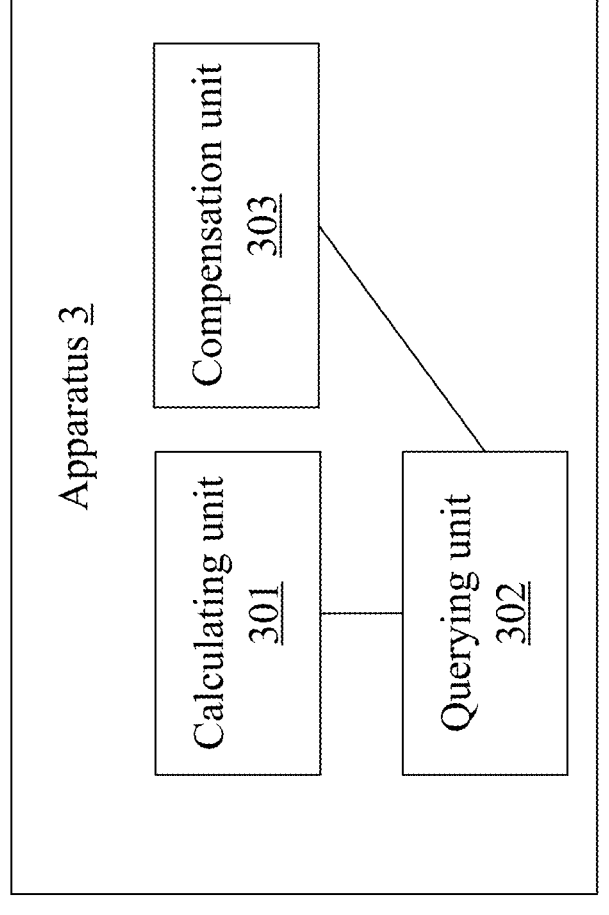
FIG. 3 is a schematic structural diagram of a compensation apparatus for continuous wave ranging according to an embodiment of this application.

In an embodiment, the apparatus 3 shown in FIG. 3 can implement the compensation method for continuous wave ranging in the embodiment shown in FIG. 2. The apparatus 3 includes a calculating unit 301, a querying unit 302, and a compensation unit 303.

The calculating unit 301 is configured to calculate a reflectivity of an object detected by a receiving unit.

The querying unit 302 is configured to query based on a preset mapping relation, for a target DRNU calibration compensation matrix associated with the reflectivity.

The compensation unit 303 is configured to compensate, using the target DRNU calibration compensation matrix, for a distance of the object detected by the receiving unit.

In some embodiments, calculating a reflectivity of an object detected by a receiving unit includes:

calculating the reflectivity of the object detected by the receiving unit based on a preset calibration distance, the distance of the object detected by the receiving unit, and the amplitude of an echo signal received by the receiving unit.

In some embodiments, calculating the reflectivity of the object detected by the receiving unit based on a preset calibration distance, the distance of the object detected by the receiving unit, and the amplitude of an echo signal received by the receiving unit includes:

calculating the reflectivity of the object detected by the receiving unit based on the following formula:

$$f_1 = G_{R_0}(A_1) \times \left(\frac{d_1}{R_0}\right)^2,$$

where $f_1$ is the reflectivity of the object detected by the receiving unit; $R_0$ is the preset calibration distance; $A_1$ represents the amplitude of the echo signal received by the receiving unit; $d_1$ represents the distance of the object detected by the receiving unit; and $G_{R_0}(\ )$ is a fitting function representing a relation between the reflectivity and the amplitude at the preset calibration distance.

In some embodiments, the apparatus 3 further includes a fitting unit (not shown in FIG. 3).

The fitting unit is configured to: measure calibration amplitude respectively corresponding to a plurality of calibration reflectivities at the calibration distance; and perform fitting on the plurality of calibration reflectivities and the calibration amplitudes respectively corresponding to the plurality of calibration reflectivities, to obtain the fitting function.

In some embodiments, calculating the reflectivity of the object detected by the receiving unit based on a preset calibration distance, the distance of the object detected by the receiving unit, and the amplitude of an echo signal received by the receiving unit includes:

calculating the reflectivity of the object detected by the receiving unit based on a query about a preset lookup table, the preset calibration distance, the distance of the object detected by the receiving unit, and the amplitude of the echo signal received by the receiving unit.

In some embodiments, the apparatus 3 further includes a calibration unit (not shown in FIG. 3).

The calibration unit is configured to: measure calibration amplitudes respectively corresponding to a plurality of calibration reflectivities at the calibration distance; and perform mapping on the calibration distance, the plurality of calibration reflectivities, and the calibration amplitudes respectively corresponding to the plurality of calibration reflectivities, to obtain the lookup table.

In some embodiments, the apparatus 3 further includes: a mapping unit (not shown in FIG. 3), configured to: calculate DRNU calibration compensation matrices respectively corresponding to the plurality of calibration reflectivities; and perform mapping on the plurality of calibration reflectivities and their corresponding DRNU calibration compensation matrices to generate the mapping relation, and storing the mapping relation.

This embodiment of this application and the method embodiment in FIG. 1 to FIG. 3 are based on the same concept, and also have the same technical effects. For a specific process, refer to the description of the method embodiment in FIG. 1 to FIG. 3. Details are not described herein again.

The apparatus 3 may be a LiDAR or a depth camera. The apparatus 3 may also be a field-programmable gate array (FPGA), a dedicated integrated chip, a system on chip (SoC), a central processing unit (CPU), a network processor (NP), a digital signal processing circuit, a micro controller unit (MCU), a programmable logic device (PLD), or other integrated chips that realize related functions.

The compensation method for continuous wave ranging in this embodiment of this application is described in detail above, and a compensation apparatus for continuous wave ranging (referred to as apparatus 4 below) in this embodiment of this application is provided below.

Figure 4:
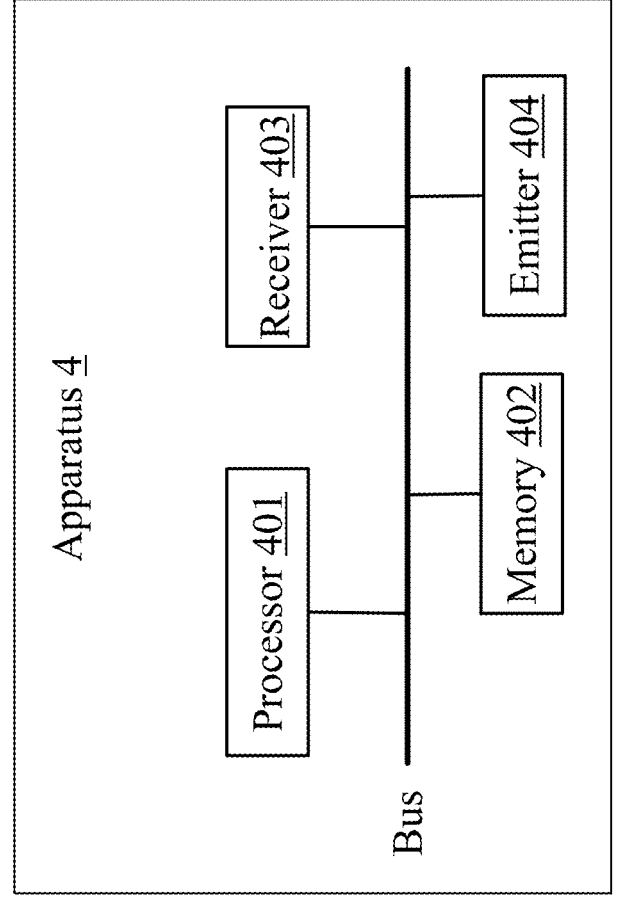
FIG. 4 is another schematic structural diagram of a compensation apparatus for continuous wave ranging according to an embodiment of this application.

FIG. 4 is a schematic structural diagram of an apparatus according to an embodiment of this application. The apparatus is referred to as an apparatus 4 below. The apparatus 4 can be integrated into a flash LiDAR or a depth camera. As shown in FIG. 4, the apparatus 4 includes: a memory 402, a processor 401, an emitter 404, and a receiver 403.

The memory 402 may be an independent physical unit, and may be connected to the processor 401, the emitter 404, and the receiver 403 through a bus. The memory 402, the processor 401, the emitter 404, and the receiver 401 can also be integrated together, or implemented through hardware or the like.

The emitter 404 can be a laser source for emitting a laser signal. For example, the emitter 404 is an LED laser or a VCSEL light source. The receiver 403 may be a CMOS receiver for receiving an echo signal, and the echo signal is a laser signal.

The memory 402 is configured to store a program for implementing the foregoing method embodiments or each module in the apparatus embodiments, and the processor 401 invokes the program to perform an operation in the foregoing method embodiments.

In some embodiments, when a part or all of the compensation method for continuous wave ranging in the foregoing embodiments is implemented through software, the apparatus may also only include a processor. The memory for storing the program is located outside the apparatus, and the processor is connected to the memory through a circuit or a wire, and is configured to read and execute the program stored in the memory.

The processor may be the central processing unit (CPU), a network processor (NP), or a combination of the CPU and the NP.

The processor can further include a hardware chip. The forgoing hardware chip can be an application-specific integrated circuit (ASIC), a programmable logic device (PLD), or a combination thereof. The forgoing PLD may be a complex programmable logic device (CPLD), a field-programmable gate array (FPGA), a generic array logic (GAL), or any combination thereof.

A memory can include a volatile memory, such as a random-access memory (RAM). The memory can also include a non-volatile memory, such as a flash memory, a hard disk drive (HDD) or a solid-state drive (SSD). The memory can also include a combination of the above types of memories.

In the foregoing embodiments, a sending unit or the emitter performs a sending step in the foregoing method embodiments, a receiving unit or the receiver performs a receiving step in the foregoing method embodiments, and another step is performed by another unit or processor. The sending unit and the receiving unit can form a transceiver unit, and the receiver and the emitter can form a transceiver.

An embodiment of this application further provides a computer storage medium that stores a computer program, where the computer program is used to perform the compensation method for continuous wave ranging provided in the foregoing embodiments.

An embodiment of this application further provides a computer program product including an instruction, and when running on the computer, the instruction enables the computer to perform the compensation method for continuous wave ranging provided in the foregoing embodiments.

The person skilled in the art should understand that the embodiments of the present application can be provided as methods, systems, or computer program products. Therefore, the present application can use forms of a hardware embodiment, a software embodiment, or an embodiment combining software and hardware. Moreover, the present application can use a form of a computer program product implemented on one or more computer-usable storage media (including but not limited to disk storage, CD-ROM, optical storage, etc.) containing computer-usable program codes.

The present application is described with reference to flowcharts and/or block diagrams of methods, devices (systems), and computer program products according to embodiments of the present application. It should be understood that each process and/or block in the flowchart and/or the block diagram, and combinations of the processes and/or the blocks in the flowchart and/or the block diagram can be realized by computer program instructions. These computer program instructions can be provided to a processor of a general-purpose computer, a special-purpose computer, an embedded processor, or other programmable data processing equipment to generate a machine, so that the instructions executed by the processor of the computer or the other programmable data processing equipment generate a device that realizes functions specified in one process or a plurality of processes in the flowchart and/or one block or a plurality of blocks in the block diagram.

These computer program instructions can also be stored in a computer-readable memory that can direct the computer or other programmable data processing equipment to work in a specific manner, so that the instructions stored in the computer-readable memory produce an article of manufacture including an instruction device. The instruction device implements the functions specified in one process or the plurality of processes in the flowchart and/or one block or the plurality of blocks in the block diagram.

These computer program instructions can also be loaded on the computer or the other programmable data processing equipment, so that a series of operation steps are executed on the computer or the other programmable equipment to produce computer-implemented processing. Therefore, the instructions executed on the computer or the other programmable equipment provide steps for implementing functions specified in one process or the plurality of processes in the flowchart and/or one block or the plurality of blocks in the block diagram.

What is claimed is:

1. A compensation method for continuous wave ranging, applied to a LiDAR comprising an emitter and a receiver, wherein the receiver comprises a plurality of receiving units, the LiDAR generates a depth image based on an echo signal, and the depth image comprises a plurality of pixels with each receiving unit corresponding to one pixel, the compensation method comprising:

calculating a reflectivity of an object detected by at least one of the plurality of receiving units;

querying, based on a preset mapping relation, for a target distance response non-uniformity (DRNU) calibration compensation matrix associated with the reflectivity; and compensating, using the target DRNU calibration compensation matrix, for a distance of the object detected by the at least one of the plurality of receiving units to obtain an actual distance of a pixel corresponding to one of the plurality of receiving units, wherein calculating the reflectivity of the object detected by the at least one of the plurality of receiving units comprises:

calculating the reflectivity of the object detected by the at least one of the plurality of receiving units based on the following formula:

$$f_1 = G_{R_0}(A_1) \times \left(\frac{d_1}{R_0}\right)^2,$$

wherein $f_1$ is the reflectivity of the object detected by the at least one of the plurality of receiving units; $R_0$ is a preset calibration distance; $A_1$ represents an amplitude of the echo signal received by the at least one of the plurality of receiving units; $d_1$ represents the distance of the object detected by the at least one of the plurality of receiving units; and $G_{R_0}(\ )$ represents a fitting function of a relationship between a reflectivity and an amplitude at the preset calibration distance.

2. The compensation method according to claim 1, wherein before calculating the reflectivity of the object detected by the at least one of the plurality of receiving units, the compensation method further comprises:

measuring calibration amplitudes respectively corresponding to a plurality of calibration reflectivities at the calibration distance; and performing fitting on the plurality of calibration reflectivities and the calibration amplitudes respectively corresponding to the plurality of calibration reflectivities, to obtain the fitting function.

3. The compensation method according to claim 1, wherein calculating the reflectivity of the object detected by the at least one of the plurality of receiving units further comprises:

calculating the reflectivity of the object detected by the at least one of the plurality of receiving units based on a preset lookup table, the preset calibration distance, the distance of the object detected by the at least one of the plurality of receiving units, and the amplitude of the echo signal received by the at least one of the plurality of receiving units, wherein the preset lookup table stores a correspondence between the amplitudes and the reflectivities at the calibration distance.

4. The compensation method according to claim 3, wherein before calculating the reflectivity of the object detected by the at least one of the plurality of receiving units, the compensation method further comprises:

measuring calibration amplitudes respectively corresponding to a plurality of calibration reflectivities at the calibration distance; and performing mapping on the calibration distance, the plurality of calibration reflectivities, and the calibration amplitudes respectively corresponding to the plurality of calibration reflectivities, to obtain the lookup table.

5. The compensation method according to claim 2, further comprising:

calculating DRNU calibration compensation matrices respectively corresponding to the plurality of calibration reflectivities;

performing mapping on the plurality of calibration reflectivities and their corresponding DRNU calibration compensation matrices to generate mapping relations; and storing the mapping relations.

6. A LiDAR, comprising a processor, a memory, an emitter, and a receiver, wherein the processor is coupled to the emitter and the receiver, the receiver comprises a plurality of receiving units, the LiDAR generates a depth image based on an echo signal, the depth image comprises a plurality of pixels with each receiving unit corresponding to one pixel, the memory is configured to store a computer program or an instruction, and the processor is configured to execute the computer program or the instruction in the memory, to control the receiver and the emitter to receive and send a signal; and wherein when the processor executes the computer program or the instruction, the processor is further configured to perform operations comprising:

calculating a reflectivity of an object detected by at least one of the plurality of receiving units;

querying, based on a preset mapping relation, for a target distance response non-uniformity (DRNU) calibration compensation matrix associated with the reflectivity; and compensating, using the target DRNU calibration compensation matrix, for a distance of the object detected by the at least one of the plurality of receiving units to obtain an actual distance of a pixel corresponding to one of the plurality of receiving units, wherein calculating the reflectivity of the object detected by the at least one of the receiving units comprises: calculating the reflectivity of the object detected by the at least one of the receiving units based on the following formula:

$$f_1 = G_{R_0}(A_1) \times \left(\frac{d_1}{R_0}\right)^2,$$

wherein $f_1$ is the reflectivity of the object detected by the at least one of the receiving units; $R_0$ is a preset calibration distance; $A_1$ represents an amplitude of the echo signal received by the at least one of the plurality of receiving units; $d_1$ represents the distance of the object detected by the at least one of the plurality of receiving units; and $G_{R_0}(\ )$ represents a fitting function of a relationship between a reflectivity and an amplitude at the preset calibration distance.

\* \* \* \* \*